United States Patent
Bensberg et al.

(10) Patent No.: US 12,326,845 B2
(45) Date of Patent: Jun. 10, 2025

(54) PAGEABLE HASH INDEX FOR DOCUMENT STORE

(71) Applicant: SAP SE, Walldorf (DE)

(72) Inventors: Christian Bensberg, Heidelberg (DE); Daniel Ritter, Heidelberg (DE); Neeraj Kulkarni, Bangalore, IN (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/654,985

(22) Filed: May 3, 2024

(65) Prior Publication Data

US 2024/0289314 A1    Aug. 29, 2024

Related U.S. Application Data

(63) Continuation of application No. 16/898,143, filed on Jun. 10, 2020, now Pat. No. 12,007,971.

(30) Foreign Application Priority Data

Apr. 27, 2020    (IN) .............................. 202011017834

(51) Int. Cl.
 *G06F 16/22* (2019.01)
 *G06F 16/93* (2019.01)

(52) U.S. Cl.
 CPC .......... *G06F 16/2255* (2019.01); *G06F 16/94* (2019.01)

(58) Field of Classification Search
 CPC .............................. G06F 16/2255; G06F 16/94
 See application file for complete search history.

(56) References Cited

U.S. PATENT DOCUMENTS

| | | | | |
|---|---|---|---|---|
| 9,992,094 | B1 * | 6/2018 | Singh | H04L 43/14 |
| 10,467,215 | B2 * | 11/2019 | Hopcroft | G06F 16/2272 |
| 2010/0153953 | A1 * | 6/2010 | Adl-Tabatabai | G06F 16/2329 |
| | | | | 718/101 |
| 2013/0097607 | A1 * | 4/2013 | Lewis | G06F 9/467 |
| | | | | 718/102 |
| 2015/0213405 | A1 * | 7/2015 | Mondal | G06Q 10/10 |
| | | | | 705/344 |
| 2019/0332695 | A1 * | 10/2019 | Bensberg | G06F 16/211 |
| 2021/0081389 | A1 * | 3/2021 | Liu | G06F 16/24552 |

* cited by examiner

*Primary Examiner* — Tyler J Torgrimson
(74) *Attorney, Agent, or Firm* — Mintz Levin Cohn Ferris Glovsky and Popeo, P.C.

(57) ABSTRACT

A method, a system, and a computer program product for generating a pageable hash index for a document store. A hash map index for data stored on disk using a document array is generated. The hash map index includes a plurality of hash values with each hash value identifying a document stored at a predetermined location in the document array. A transaction for executing using a first document stored in the document array is received. Using the generated hash map index, a location of the first document stored in the document array is identified. At least a portion of a first hash value of the hash map index corresponding to the first document is loaded into a memory location without loading the remaining hashes of the hash map index. Based on the loaded portion of the first hash value, the received transaction is executed.

20 Claims, 17 Drawing Sheets

| Slice 1 | identifier | value |
|---|---|---|
| 202 | id | 100 |
| | city | Heidelberg |
| | order_date | 2018-04-01 |

| Slice 2 | identifier | value |
|---|---|---|
| 204 | id | 110 |
| | city | Aachen |
| | order_date | 2018-04-01 |

| Slice 3 | identifier | value |
|---|---|---|
| 206 | id | 8100 |
| | city | Chicago |
| | order_date | 2018-04-02 |

| Slice 4 | identifier | value |
|---|---|---|
| 208 | id | 180 |
| | city | Bonn |
| | order_date | 2018-04-15 |

| Slice 5 | identifier | value |
|---|---|---|
| 210 | id | 8150 |
| | city | Denver |
| | order_date | 2018-04-16 |

Hash Map 502

| Hash | DocArrayPos |
|---|---|
| Hash 0 | 5 |
| Hash 1 | 4 |
| Hash 2 | |
| Hash 3 | 3 |
| Hash 4 | |
| Hash 5 | |

Document Array 504

| | |
|---|---|
| Doc 45 | next: -1 |
| Doc 60 | next: 0 |
| Doc 100 | next: -1 |
| Doc 101 | next: 2 |
| Doc 104 | next: 1 |
| Doc 42 | next: -1 |

FIG. 7b

Slice — 704

| DocumentPos | (Version) | MVCCTimestamp | Data |
|---|---|---|---|
| (0 \| 4 \| 42) | 0 | CTS: 100 | {"id": 5, "x": 10} |
| (0 \| 4 \| 42) | 1 | TCB: 10 | {"id": 5, "x": 11} — 701 |
| (0 \| 4 \| 42) | 2 | TCB: 110 | {"id": 6, "x": 11} |
| (0 \| 4 \| 42) | 3 | TCB: 110 | {"id": 5, "x": 11} — 703 |

Index, on "id" identifier — 702

| DocumentPos | MVCCTimestamp | Hash value |
|---|---|---|
| (0 \| 4 \| 42) | CTS: 100 | 500 |
| (0 \| 4 \| 42) | TCB: 10 | 500 |
| (0 \| 4 \| 42) | TCB: 80 | 600 |
| (0 \| 4 \| 42) | TCB: 80 | 500 |

FIG. 7c

Slice — 704

| DocumentPos | (Version) | MVCCTimestamp | Data |
|---|---|---|---|
| (0 \| 4 \| 42) | 0 | CTS: 100 | {"id": 5, "x": 10} |
| (0 \| 4 \| 42) | 1 | TCB: 10 | {"id": 5, "x": 11} |
| (0 \| 4 \| 42) | 2 | TCB: 110 | {"id": 6, "x": 11} |
| (0 \| 4 \| 42) | 3 | TCB: 110 | {"id": 5, "x": 11} |

Index, on "id" identifier — 706

| DocumentPos | MVCCTimestamp | Hash value |
|---|---|---|
| (0 \| 4 \| 42) | CTS: 100 | 500 |
| (0 \| 4 \| 42) | TCB: 10 | 500 |
| (0 \| 4 \| 42) | CTS: 110 | 600 |
| (0 \| 4 \| 42) | CTS: 110 | 500 |

Slice 704

| DocumentPos | (Version) | MVCCTimestamp | Data |
|---|---|---|---|
| (0 \| 4 \| 42) | 0 | CTS: 100 | {"id": 5, "x": 10} |
| (0 \| 4 \| 42) | 1 | TCB: 10 | {"id": 5, "x": 11} |
| (0 \| 4 \| 42) | 2 | TCB: 110 | {"id": 6, "x": 11} |
| (0 \| 4 \| 42) | 3 | TCB: 110 | {"id": 5, "x": 11} |

Index, on "id" identifier 706

| DocumentPos | MVCCTimestamp | Hash value |
|---|---|---|
| (0 \| 4 \| 42) | CTS: 100 | 500 |
| (0 \| 4 \| 42) | TCB: 10 | 500 |
| (0 \| 4 \| 42) | CTS: 110 | 600 |
| (0 \| 4 \| 42) | CTS: 110 | 500 |

Undo records 708

| DocumentPos | Value |
|---|---|
| (0 \| 4 \| 42) | 5 |
| (0 \| 4 \| 42) | 6 |
| (0 \| 4 \| 42) | 5 |

FIG. 7e

Slice

| DocumentPos | (Version) | MVCCTimestamp | Data |
|---|---|---|---|
| (0 \| 4 \| 42) | 0 | CTS: 100 | {"id": 5, "x": 10} |
| (0 \| 4 \| 42) | 1 | TCB: 10 | {"id": 5, "x": 11} |
| (0 \| 4 \| 42) | 2 | TCB: 110 | {"id": 6, "x": 11} |
| (0 \| 4 \| 42) | 3 | TCB: 110 | {"id": 5, "x": 11} |

Index, on "id" identifier

| DocumentPos | MVCCTimestamp | Hash value |
|---|---|---|
| (0 \| 4 \| 42) | CTS: 100 | 500 |
| (0 \| 4 \| 42) | TCB: 10 | 500 |
| (0 \| 4 \| 42) | CTS: 110 | 600 |
| (0 \| 4 \| 42) | CTS: 110 | 500 |

PAGEABLE HASH INDEX FOR DOCUMENT STORE

CROSS REFERENCE TO RELATED APPLICATIONS

This application is a continuation of application Ser. No. 16/898,143 filed May 23, 2022, entitled "PAGEABLE HASH INDEX FOR DOCUMENT STORE," which claims priority to Indian Provisional Patent Application No. 202011017834, filed Apr. 27, 2020, entitled "PAGEABLE HASH INDEX FOR DOCUMENT STORE." The disclosures of which are incorporated herein by reference in their entirety.

TECHNICAL FIELD

This disclosure relates generally to data processing and, in particular, to a pageable hash index for a document store.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Data stored by such systems may be stored in one or more partitions. Given the complexity of queries, volume of data stored, and/or their volume, the underlying databases face challenges in order to optimize performance.

SUMMARY

In some implementations, the current subject matter relates to a computer-implemented method for generating a pageable hash index for a document store. The method may include generating a hash map index for data stored on disk using a document array. The hash map index may include a plurality of hash values. Each hash value in the plurality of hash values may identify a document stored at a predetermined location in the document array. The method may also include receiving a transaction for executing using a first document stored in the document array, identifying, using the generated hash map index, a location of the first document stored in the document array, loading, into a memory location, at least a portion of a first hash value of the hash map index corresponding to the first document without loading the remaining hashes of the hash map index, and executing, based on the loaded portion of the first hash value, the received transaction.

In some implementations, the current subject matter can include one or more of the following optional features. In some implementations, the document array may include a plurality of linked documents. The identification of the location may include locating at least a second document stored in the document array based on the identification of the first document.

In some implementations, the loaded portion of the first hash value may include most-significant bits of the first hash value. The most-significant bits of the first hash value may correspond to the most-significant bits of a value in the first document.

In some implementations, the transaction may include at least one of the following: a data insert transaction, a data update transaction, a data delete transaction, a data read transaction, a data write transaction, and any combination thereof.

In some implementations, the method may include allowing at least one of the following: a plurality of read transaction on the data stored in the document store, a single write transaction at a time on the data stored in the document store, and any combination thereof.

In some implementations, the method may also include determining a threshold commit timestamp value for the received transaction, identifying one or more hash values in the hash map index corresponding to commit timestamp values being less than the threshold commit timestamp value, storing the identified one or more hash values in a checkpoint set, truncating a transaction log corresponding to the received transaction at a location corresponding to a location of the determined threshold commit timestamp in the transaction log, and erasing data previously stored in the checkpoint set, and executing commit of the received transaction with respect to the stored one or more hash values.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 5a-b illustrate an exemplary process for determining how data updates/inserts may be written into a hash map structure, according to some implementations of the current subject matter;

FIGS. 7a-7e illustrate an exemplary update process of tables corresponding to a particular slice and a hash map index corresponding to the slice, according to some implementations of the current subject matter;

DETAILED DESCRIPTION

Figure 1:
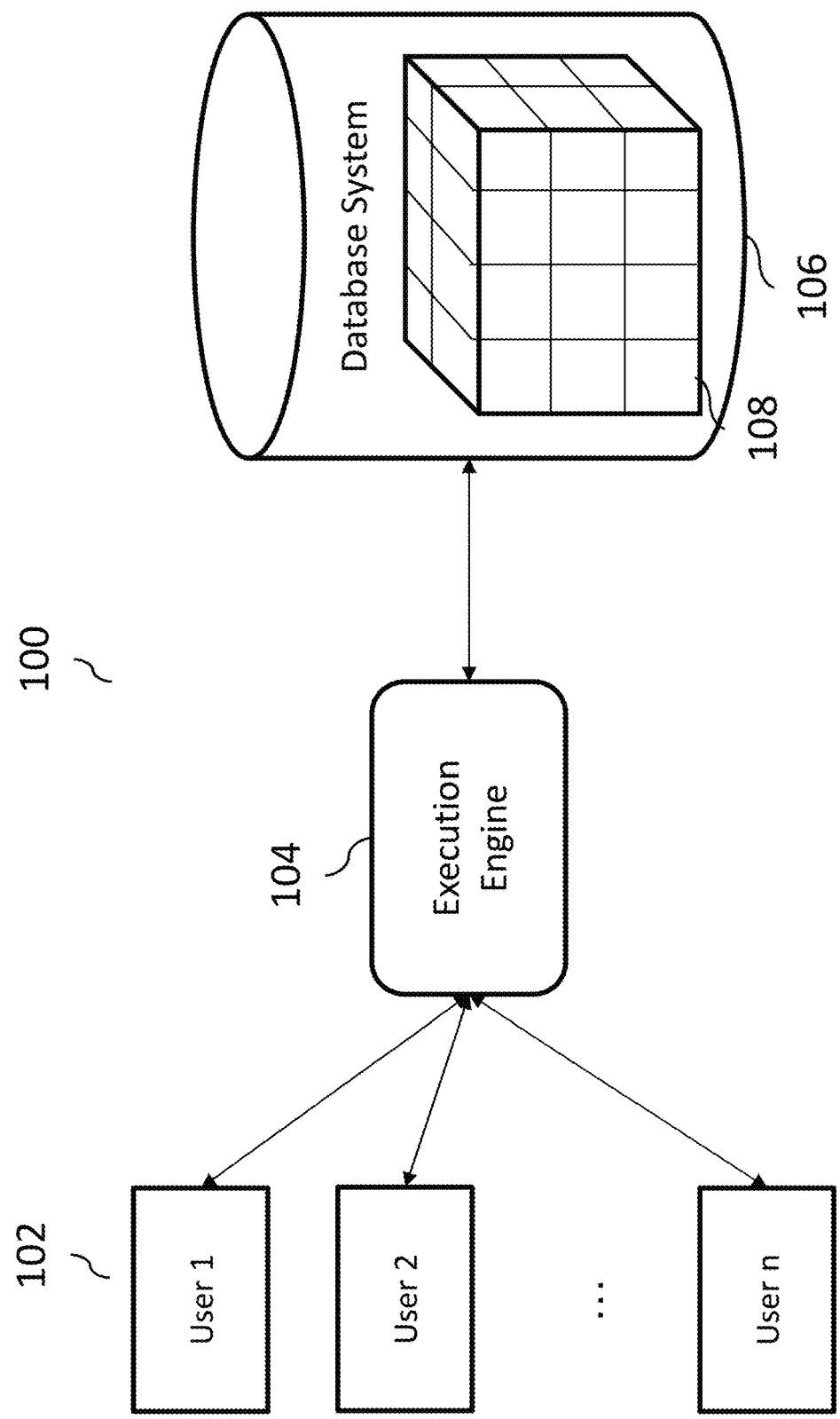
FIG. 1 illustrates an exemplary system for generating a pageable hash index, according to some implementations of the current subject matter.

To address these and potentially other deficiencies of currently available solutions, one or more implementations of the current subject matter relate to methods, systems, articles of manufacture, and the like that can, among other possible advantages, provide a pageable hash index for a document store.

Database management systems and operations performed on the data managed by a database management system have become increasingly complex. For example, a database management systems (or database for short) may support relatively complex online analytical processing (OLAP, which may perform multi-dimensional analysis) to more straightforward transaction-based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database may include a complex sequence of operations in order to generate corresponding responses. To implement the complex sequence, a query execution plan (or query plan for short) may be implemented. The query plan may represent a sequence of operations, such as instructions, commands, and/or the like, to access data in the database. The database may also include a query plan optimizer to determine an efficient way to execute the query plan.

From an application or client perspective, it may be extremely cumbersome to access databases. For example, an application may need to query different types of databases using complex queries. As a consequence, the application layer may need to be configured to handle the various types of databases and various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

Database systems may store data using one or more partitions or slices. A partition in a database may refer to a division of a logical database or its elements into separate independent parts. Partitioning allows improved manageability, performance, load balancing, etc. In some cases, partitions may be distributed over multiple nodes, where each node may allow users to perform various operations (e.g., execution of transactions, etc.) on a partition. Such distribution may increase performance for nodes that may be subject to frequent transactions that may involve retrieval, insertion, modification, generation of views of data, etc. while at the same time maintaining availability and security of data. Data partitioning may be performed by building separate smaller databases, splitting selected elements, etc. Data may be partitioned using horizontal or vertical partitioning methodologies. A horizontal partitioning may place different rows into different tables (e.g., splitting users of different age groups). A vertical partitioning may create new tables having fewer columns and may use additional tables to store any remaining columns.

In some implementations, the current subject matter may be configured to provide a hash index for a document store that may be pageable, including, for example, pages on a disk, containing data (e.g., specific data may be retrieved based using the index). A hash index may be configured as an array of buckets or slots, where each of the buckets may be configured to include a pointer to one or multiple rows containing data. Hash indexes may use a hash function, where for a key and a number of buckets, the hash function may be configured to map the key to the corresponding bucket of the hash index. The buckets store memory address or similar logical pointers where data may be placed, but typically do not store keys or hashed value. Generally, a hash function may be any algorithm that maps data of variable length to data of a fixed length in a deterministic and close to random way.

In some implementations, the current subject matter may be configured to provide a system for querying data using a pageable hash index, where, using such hash index, only the data that is responsive to the query is loaded from the disk storage, without loading the entirety of data. Further, the current subject matter system may be configured to provide updates to data without a priori knowledge of sizes of the update. By way of an example, reading of data may also be enabled without being affected by a lock. Moreover, the hash index may be configured to allow for storage of additional data without dedicated reorganization phases, e.g., a reorganization of data once it is determined that a certain threshold has been exceeded. Further, the current subject matter does not require storage of keys in the index, which may create memory constraints. Also, by using pageable hash index, false positives (e.g., obtaining incorrect data, data location, etc.) may be substantially avoided. The hash index may also provide an automatic cleanup feature, whereby operations UPDATE/DELETE and/or ROLLBACK may be configured to erase old data. Furthermore, for any commit timestamp (CommitTS or CTS or CommitID or CID, all of which are used interchangeably herein) (e.g., time when a transaction is committed in the database), a database snapshot may be generated, where log replay may start with CommitTS+1. Also, one or more hash maps may be generated.

FIG. 1 illustrates an exemplary system 100 for generating a pageable hash index, according to some implementations of the current subject matter. The system 100 may include one or more users (user 1, user 2, . . . user n) 102, an execution engine 104, and a database system 106, which may store data in one or more slices 108. The users 102, the execution engine 104, and the database system 106 may be communicatively coupled with one another using any type of network, including but not limited to, wired, wireless, and/or a combination of both. The users 102 may include at least one of the following: computer processors, computing networks, software applications, servers, user interfaces, and/or any combination of hardware and/or software components. Database system 106 may include at least one of the following: databases, storage locations, memory locations, and/or any combination of hardware and/or software components. In some implementations, the database system 106 may be a High-Performance Analytic Appliance ("HANA") system as developed by SAP SE, Walldorf, Germany, as will be described below.

The execution engine 104 may include any combination of software and/or hardware components and may be configured to receive and execute a query from one or more users 102 to obtain data in one or more slices 108 in the database system 106, insert data into one or more slices 108 in the database system 106, modify data stored in one or more slices 108 in the database system 106, delete data stored in one or more slices 108 in the database system 106, generate one or more new slices 108 (e.g., for insertion of new data), etc., and any combination thereof. In some implementations, the execution engine 106 may be included in the database system 106. Data may be inserted, modified, deleted, etc., new slices may be created, existing slices may be modified, deleted, etc., which may cause modification of an existing data storage structures.

Execution of a query may typically require generation of a query plan or query execution plan, which may be an ordered set of operations that may be used to access stored data (e.g., access data in a SQL relational database management system). Upon submission of a query to the database system 106, requested data may be retrieved based on parameters of the query. The retrieved data may be aggregated/joined with any other data that may be sought by the user. Insertion, modification, deletion, etc. of data in the database system 106 may be performed using various SQL or other statements.

The database 106 may be used to store various data arranged in one or more tables. The stored data may be modified, by way of a non-limiting example, through one or more data manipulation language ("DML") processes, which may include one or more operations, including but not limited to, INSERT (e.g., insertion of data into an existing data at a predetermined offset or location), UPDATE (e.g., modification of stored data), and DELETE (e.g., deletion of stored data). Additionally, for example, the stored data may be affected using various data definition language ("DDL") statements, which may include creation of various schema for data storage. In some implementations, the databases may include one or more servers, processors, memory locations, cloud computing components/systems, etc. that may be used during creation of databases, testing, redo of operations, creation of logs, etc.

When database records are created, modified, deleted, the system 100 may generate various logs that may include various information about transactions that may have been executed by the system 100. The logs may be important to ensure integrity, synchronization, etc. of the records, databases, etc. The generated logs may provide a log replay functionality, such as, for example, facilitating a re-loading of data from disk into the database after unloading on a database artifact (e.g., a slice and/or partition and/or index bucket), a restarting of the database and/or after a crash, and/or for any other reason.

During operation of a database system (e.g., HANA (as developed by SAP SE, Walldorf, Germany)), there may be one or more operations that may be executed concurrently (while obeying the atomicity, consistency, isolation, and durability ("ACID") properties). All actions that modify persistency of the database write one or more redo records. When log replay functionality is executed, the redo records may be replayed to place that database into a predetermined state (e.g., prior to insertion of a record into the database). The log replay functionality may be used during crash-restart of a computing system, point-in-time recovery of the computing system, in high-availability secondary systems, Active/Active systems, and/or any other types of systems and/or for any other purposes.

Figure 2:
FIG. 2 illustrates exemplary slices, according to some implementations of the current subject matter.

FIG. 2 illustrates exemplary slices 1-5 202-210. As shown in FIG. 2, slices 202-205 may be tables that may include an index. For example, slice 1 202 may include an identifier column and value column. The identifier column may include an "id", "city" and "order_date". Each of these include a range of values, for example, the "id" identifier may include a value of "100", the "city" identifier may include a value of "Heidelberg", and the "order_date" identifier may include a value of "2018-04-01".

Similarly, slice 2 204 may include different ranges for its identifiers. For example, the "id" identifier value may be "110"; the "city" identifier may include a value of "Aachen", and the "order_date" identifier may include a value of "2018-04-01". In slice 3 206, the "id" identifier may include a value of "8100", the "city" identifier may include a value of "Chicago", and the "order_date" identifier may include a value of "2018-04-02". In slice 4 208, the "id" identifier may include a value of "180", the "city" identifier may include a value of "Bonn", and the "order_date" identifier may include a value of "2018-04-15". In slice 5 210, the "id" identifier value is "8150", the "city" identifier value is "Denver", and the "order_date" identifier value is "2018-04-16". In an exemplary setup, a particular slice may be configured to store a plurality of records (e.g., for ease of discussion and simplicity of illustration, FIG. 2 shows one record).

Figure 3:
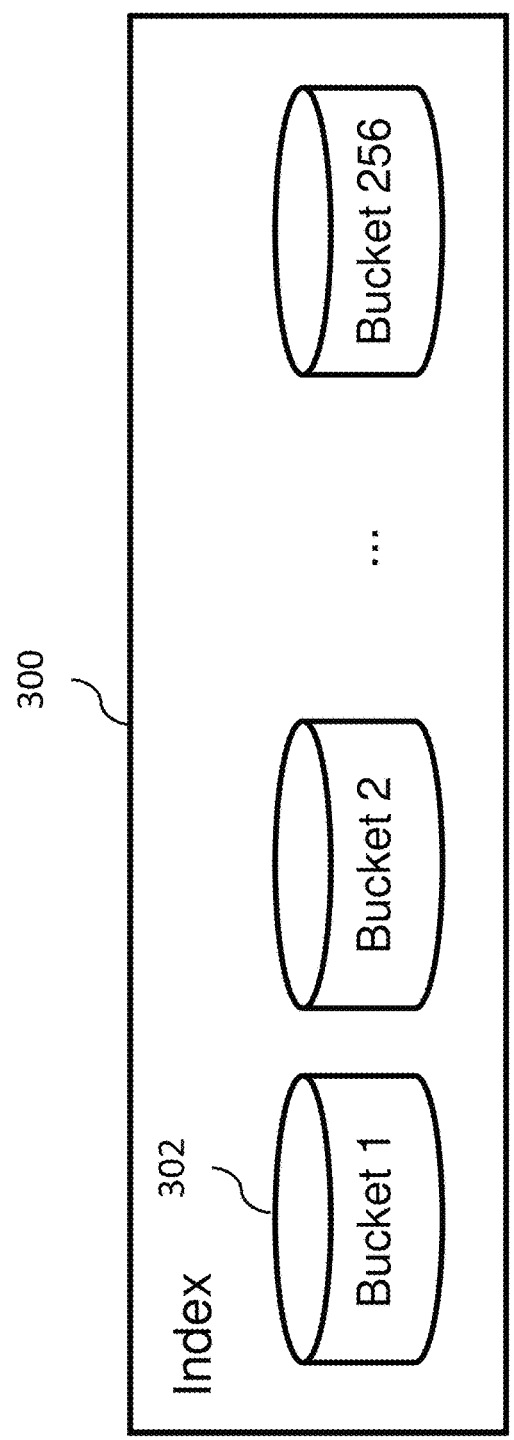
FIG. 3 illustrates an exemplary hash index, according to some implementations of the current subject matter.

FIG. 3 illustrates an exemplary hash index 300, according to some implementations of the current subject matter. The index 300 may be configured to be organized in accordance with one or more data "buckets" 302 (e.g., "Bucket 1", "Bucket 2", . . . , "Bucket 256"), which may correspond to and/or identify and/or include one or more data that may be stored in a database (e.g., database 106 shown in FIG. 1). The data buckets 302 may be configured to be identified using most-significant bits of data hashes corresponding to data stored by the respective buckets. Hence, any queries seeking data stored in the buckets may be configured to use the most-significant bits of data hash to retrieve data from the identified buckets only. Other data that is not requested, will not be loaded, thereby expediting processing of queries. Hence, only $\frac{1}{256}^{th}$ of the data may need to be loaded.

Further, for any data that may need to be inserted, deleted, updated, checkpointed, cleaned up, etc. only specific bucket(s) may be loaded, whereas remaining buckets are not. Thus, any of these functions (e.g., insert, delete, update, checkpoint, etc.) may be performed with respect to only $\frac{1}{256}^{th}$ of the data. In some implementations, the current subject matter may be configured to implement local (e.g., bucket-specific) read and/or write locks that may prevent execution of the above functions on buckets that are not affected by execution of the functions.

In some implementations, the current subject matter's hash index may be used for the purposes of performing periodic updates to data stored in the database. For example, updates may be performed without performing reorganization of data. A single hash map may be used for performing of updates to data.

Updates to data may be performed using one or more hash map structures and/or tables that may be generated when data provided for storage. Every time an update is received by the execution engine 104, the hash map structure may be updated with new values. One or more of the following alternatives for performing updates to stored data may be implemented. For example, one of the alternatives may include providing updates to existing hash map structure and when the hash map structure is filled to its capacity, a new hash map structure, having a larger size may be built, which may also include rebuild the original hash map structure in its entirety. This approach may be problematic as rebuilds may need to be performed frequently and would negatively affect runtime behavior of database systems, especially, in view of an uncertainty of a number of modifying operations that may require more storage space, e.g., INSERT and/or UPDATE operations.

Figure 4A:
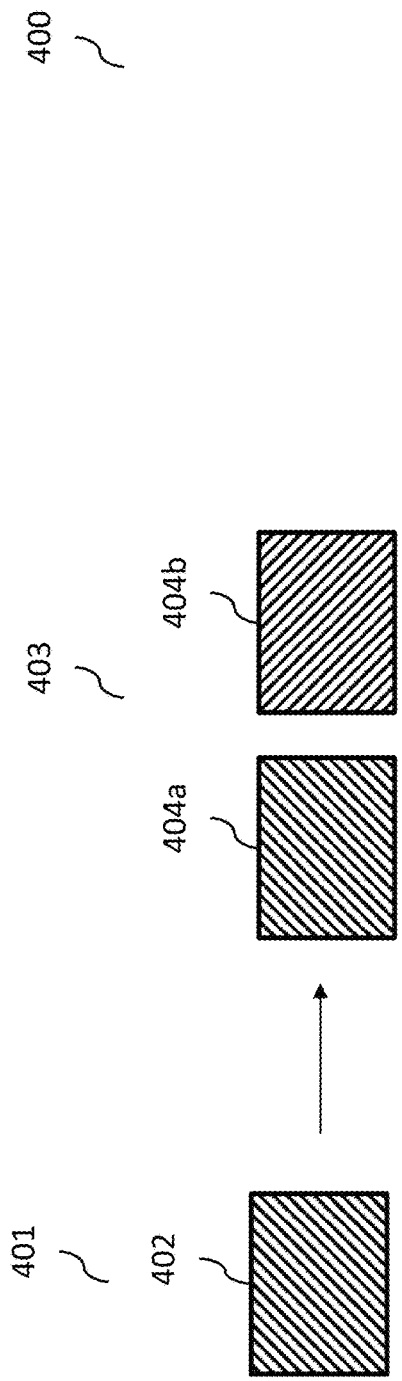
FIGS. 4a-b illustrate exemplary hash map structure alternative processes, according to some implementations of the current subject matter.
Figure 4B:
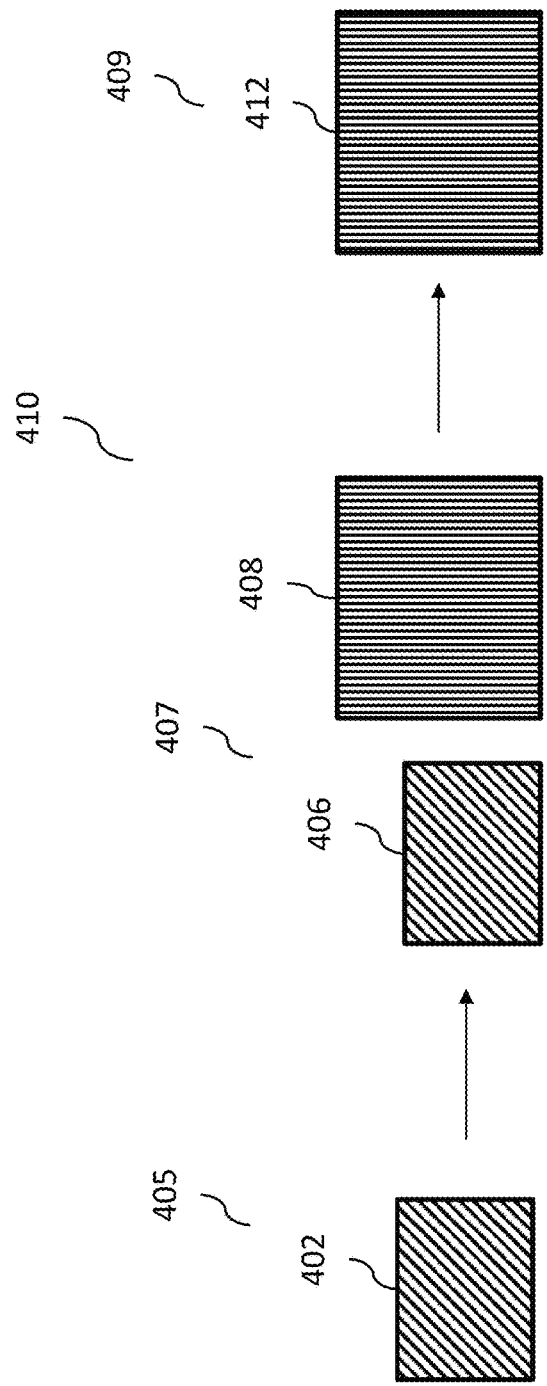

FIGS. 4a-b illustrate exemplary hash map structure alternative processes 400, 410, respectively, according to some implementations of the current subject matter. As shown in FIG. 4a, the hash map structure alternative process 400 may include addition of a new hash map structure (e.g., hash map structure 404b) to an existing hash map structure (e.g., hash map structure 402, at time 401) to create two hash map structures (e.g., hash map structures 404a (corresponding to and/or is identical to structure 402 at time 403) and new structure 404b, at time 403). Hash map structures 404 (a, b) may be created (at time 403) upon detecting that the original hash map structure 402 (at time 401) has become full and hence, cannot accept any more updates. The hash map structures 404a and 404b may each have the size of the original hash map structure 402. This alterative process does not require reorganization of the original hash map structures, which, as stated above, may affect runtime behavior of database systems (e.g., system 108 shown in FIG. 1). A possible drawback may include execution of multiple lookup operations when querying data, i.e., an execution engine may have to look into both hash map structures 404a and 404b to determine existence of the queried data.

As shown in FIG. 4b, alternative process 410 may be configured to resolve the above issues. In particular, upon detecting that the original hash map structure 402 has become full (at time 405) and no further inserts, updates may be accepted, hash map structure 406 (which corresponds to and/or is identical to the hash map structure 402 at time 407) and new hash map structure 408 may be created (at time 407). In some implementations, the hash map structure 408 may be configured to have a greater size than the hash map structure 406, where the hash map structure 406 have the same size, as stated above, as the original hash map structure 402. Each insert and/or update of data into the hash map structure 406 may cause moving of one or more entries contained in the hash map structure 406 into the hash map structure 408. The hash map structures 406 and 408 may be configured to co-exist for a predetermined period of time. After expiration of that predetermined period of time and once all entries from the hash map structure 406 have been moved to hash map structure 408 (e.g., at time 407), the hash map structure 406 may be configured to be dissolved (e.g., deleted), whereby all entries in the hash map structure 406 may now be stored in the hash map structure 408 (e.g., becoming hash map structure 412 at time 409).

Figure 5B:
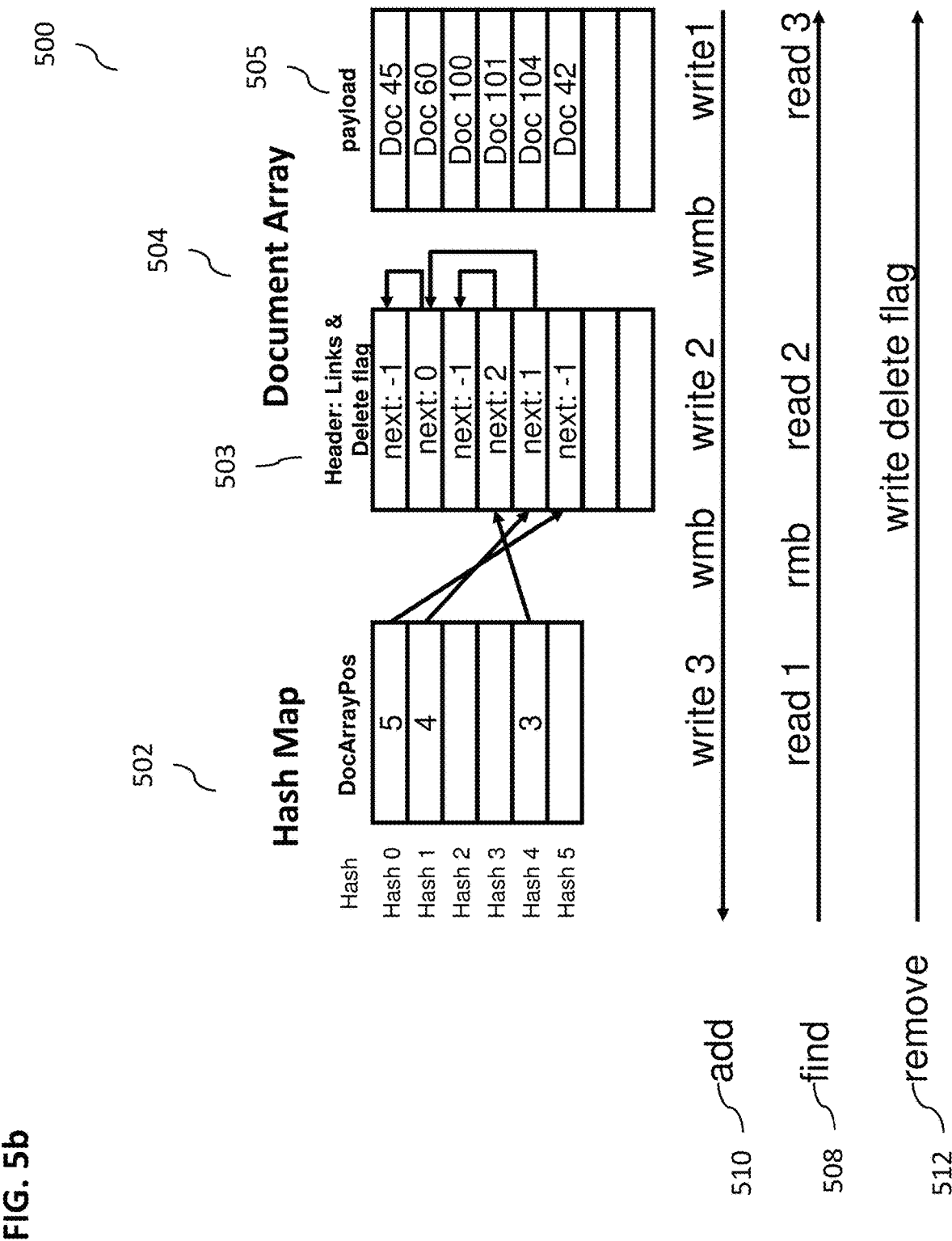

In some implementations, the engine 104 may be configured to determine which data updates and/or inserts are written into an existing hash map structure. FIGS. 5a-b illustrate an exemplary process 500 for determining how data updates/inserts may be written into a hash map structure, according to some implementations of the current subject matter. As shown in FIG. 5a, a hash map 502 may be configured to include a plurality of hash values (Hash 0, 1, 2, . . . 5) and corresponding document array positions (e.g., Hash 0 corresponds to position 5 in the document array; Hash 1 corresponds to position 4 in the document array, etc.). The hashes and positions in the hash map 502 may be configured to locate the data that may be requested (e.g., queried, updated, inserted, etc.). The hash map 502 may be configured to avoid read locks and may be used to locate appropriate data without being affected by such read locks.

The hash map 502 may be configured to point to specific positions in a document array 504, which may be part of the bucket 302 as the hash map. For example, Hash 0, which corresponds to document array position 5, may be used to locate Document 42 ("Doc 42") in the document array 504. Some documents in the document array 504 may be linked to other documents in a form of a linked list. For example, Hash 1, corresponding to document array position 4, may point to Document 104 ("Doc 104"). However, Document 104 may be linked to Document 60 ("Doc 60"), which, in turn, may also be linked to Document 45 ("Doc 45"). Hence, any updates/inserts to data that may be part of a linked list may be handled in accordance with this linked list. While updates/inserts (e.g., writes) are being performed, reading of data contained in the document array 504 is not locked.

In some implementations, to perform updates to data in the document array 504, any new data may be written first (e.g., in the Document 104) with updates being propagated to other documents (e.g., Documents 60 and 45) in accordance with the order defined by the linked list. Additionally, or alternatively, all links in the linked list may be written atomically. In some exemplary, non-limiting implementations, updates/inserts may be limited to a predetermined size (e.g., 64 bits) to ensure availability of any shared resources. Further, any memory offsets may be aligned at predetermined offsets (e.g., aligned at 8 bits). Moreover, a periodic cleanup (as opposed to deletion) may be executed to ensure that data in the document array 504 is updated properly. This process may be performed by executing rewriting of any updated data once the current subject matter system detects that the data is no longer being requested for reading. Alternatively, data may be unloaded, whereby during a re-load, only the necessary data may be restored.

FIG. 5b illustrates further detail of the read lock-less data update process shown in FIG. 5a. As shown in FIG. 5b, the document array 504 may be configured to include a header (e.g., links and/or any delete flags) 503 and a payload 505 (e.g. Documents 45, 60, 100, etc.). To initiate a writing and/or a deletion, a find operation 508, which may include one or more reads 1, 2, 3 may be used. Each read may be separated by a read memory barrier ("rmb"). For example, read 1 may be executed to locate a specific document array position in the hash map 502. The following read, e.g., read 2, may be used to read headers and determine any links between documents. Once those are determined, read 3 may be used to locate the actual document(s) in the payload 505. The find operation 508 may be configured to determine visibility of certain data for the purposes of adding and/or removing of data.

To add data to the documents, an add operation 510 may be used. To remove, e.g., write delete flag, a remove operation 512 may be used. Execution of these may be also subject to visibility of data. The add operation may include one or more writes 1, 2, 3, which may be separated by write memory barriers ("wmb"). A first write, e.g., write 1, may be executed in the payload 505 (e.g., add a Document 42), which may be followed by a write 2 to update the header portions 503 of the document array 504 (e.g., adding "next: −1" in the header). Write 3 may be executed to update the hash map 502 to ensure that the added Document 42 can be located.

In some implementations, the current subject matter's hash map index may be configured to avoid storing of keys in the hash map index as well as prevent occurrence of false positives, such as, when data is queried. In some cases, a size of the hash map 502 (as shown in FIGS. 5a-b) may be determined based on a size of the document array 504. For example, the size of the hash map may be set to be four times (and/or any other number of times) the size of the document array size. This may result in quite a few collisions. To avoid occurrence of collisions, buckets in the hash map index may be identified or determined using a least number of significant bits (e.g., 2) of data. The hash map size may then be determined, for example, as modulo (4*document array size). Then, each entry in the document array 504 may be configured to store 46 most significant bits of the data corresponding to the hash map index entry. Hence, to locate a document in the document array 504, hash values may be used to locate documents with matching 46 most-significant hash bits. Thus, when an index lookup is being performed, the hash bits may be used to avoid returning of false positives. For example, assuming that the value of "Heidelberg" is being looked up. The most-significant bits may be used to determine a specific bucket where this value may exist. Using the hash function and the size of the hash map (e.g., using the modulo (4*document array size)), a corresponding entry in the hash map 502 may be determined. Then, a pointer into the document array 504 may be used, whereby a linked list may be configured to identify a plurality of documents. Some of the identified documents may actually contain the value "Heidelberg", however, because of the modulo operation, collisions may be likely. Hence, by comparing the 46 least-significant bits of the hash value that are stored as part of the header, possible collisions may be eliminated from an intermediate result. In some implementations, the execution engine 104 may use the result of the index lookup to obtain actual slices containing the documents. Then, the actual data within the documents may be compared to the original search term "Heidelberg".

Figure 6:
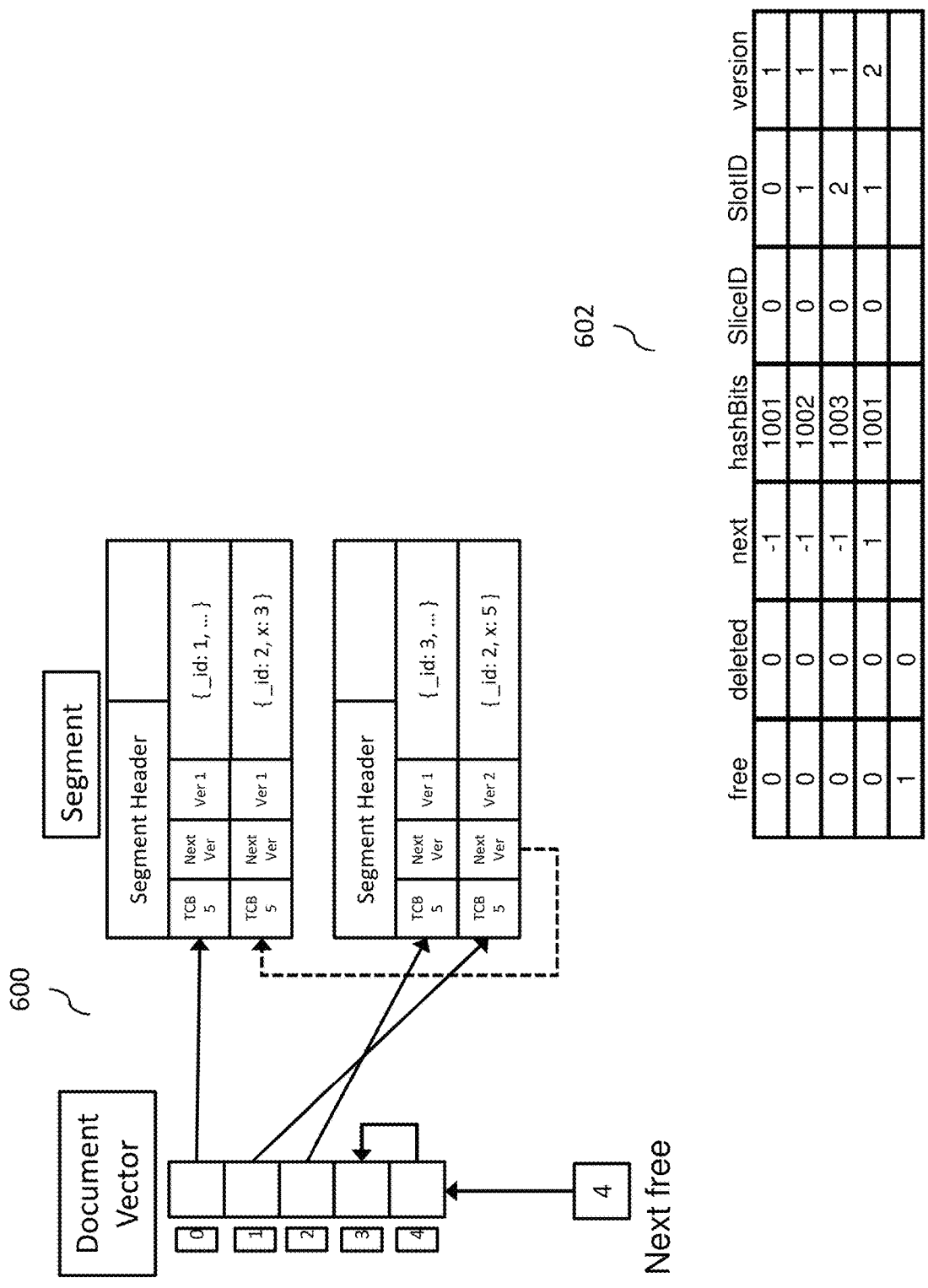
FIG. 6 illustrates an exemplary document and a corresponding table that includes various identifiers for a document array corresponding to a slice of data, according to some implementations of the current subject matter.

In some implementations, the hash map index may be used to execute various UPDATE/DELETE operations and/or ROLLBACK operations. These may be used to erase (e.g., purge) data, such data that is no longer current and/or not being used. To remove data, the current subject matter system may need to know which specific entry in the document array 504 to remove. In some implementations, document position (DocPos), which may include a partition identifier (PartitionID), a slice identifier (SliceID), and a slot identifier (SlotID) may be used. However, in some cases, where one or more of these identifiers might not be unique, DocPos may identify multiple versions per document stored in the document array. FIG. 6 illustrates an exemplary slice 600 and a corresponding table 602 that includes various identifiers for a document array corresponding to a slice of data. In particular, FIG. 6 shows an exemplary document vector having SlotIDs 0 to 4 of a slice having SliceID 0. As shown in FIG. 6, hashBits 1001 correspond to the same SliceID, i.e., 0, however, show two different documents (i.e., at SlotID 0 and SlotID 1 in table 602). Hence, hash collisions may occur. Moreover, same SlotID (e.g., 1) may correspond to different hashBits for different versions of the same document, i.e., hasBits 1002 and 1001.

Figure 7A:
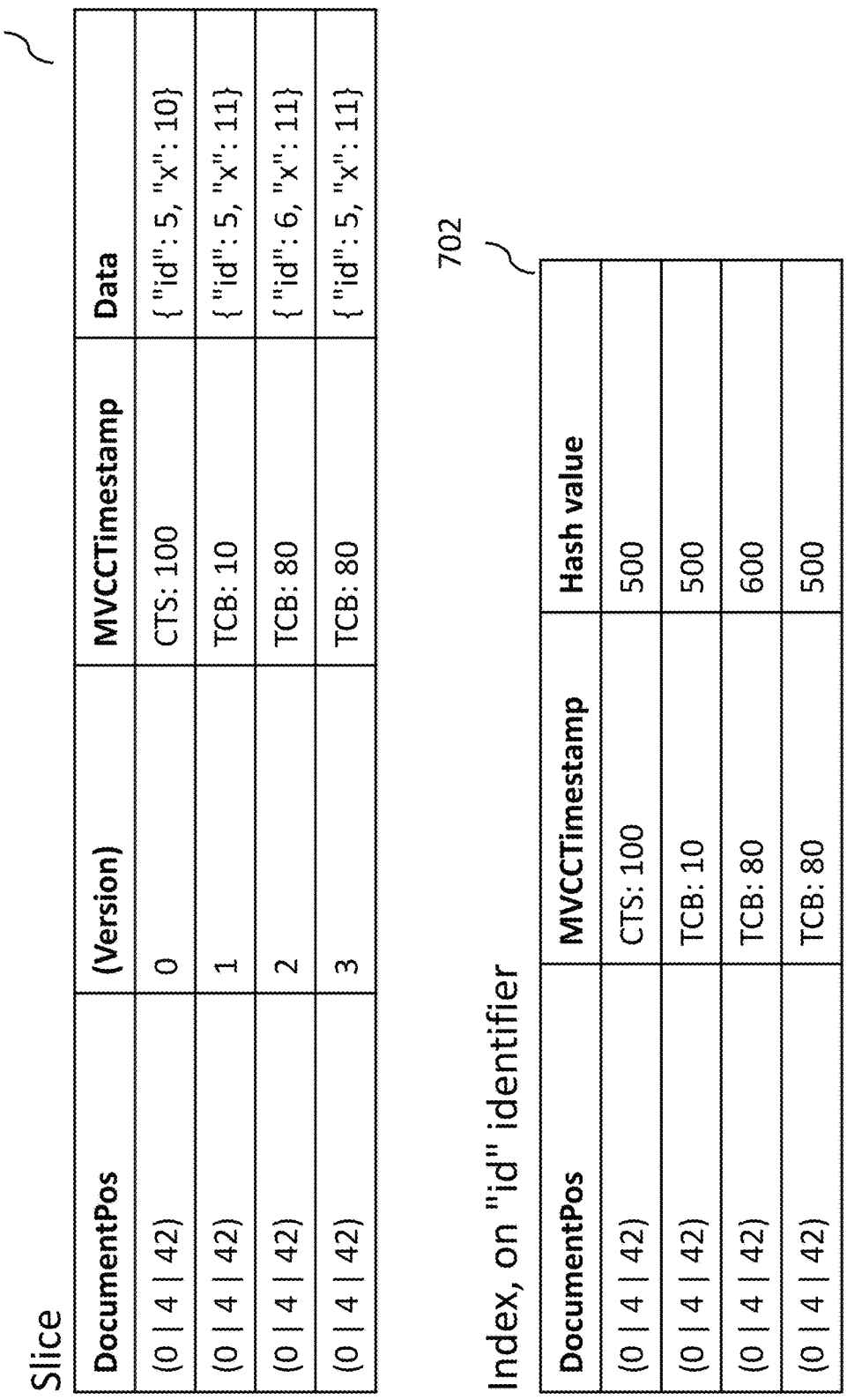

FIGS. 7a-7e illustrate an exemplary update process of tables corresponding to a particular slice 700 and a hash map index 702 corresponding to the slice 700, according to some implementations of the current subject matter. The table containing the index may be generated using an "id" identifier contained in the Data column of the slice 700. The update process shown in FIGS. 7a-e may be performed without knowledge of the version, which may result in multiple results if specific entries are to be processed (e.g., as shown in FIG. 7e, processing of entry corresponding to hash(Value 5) may result in three possible candidates, hence, requiring knowledge of a version of data for retrieval).

The DocumentPos column in tables 700, 702 may include PartitionID (e.g., 0, as shown in FIGS. 7a-e), SliceID (e.g., 4, as shown in FIGS. 7a-e), and SlotID (e.g., 42, as shown in FIGS. 7a-e). The table 700 may also include Version column indicating a version of a data (e.g., 0, 1, 2, 3). A multi-versions concurrency time stamp (MVCCTimestamp) or transaction identifier column may include information relating to a transaction control block (TCB), which may correspond to a temporary transaction identifier value (which may be reused), a commit identifier (CTS). The slice table 700 may include a column for the data (e.g., {"id": 5, "x": 10}), whereas the hash map index table 702 may include a corresponding hash value for the identifier "id" (e.g., 500), as shown in FIG. 7a.

As shown in FIG. 7b, a transaction may be committed, whereby TCB 80 may be changed to TCB 110 in the slice table 700 (now table 704 as shown in FIG. 7b) in the rows 701, 703. The changes may be executed as a part of an update, insert, delete, rollback, etc. No change occurs in the hash map index table 702 at this time.

FIG. 7c illustrates a commit operation in the hash map index table 702 (shown in FIG. 7a), whereby TCB 80 is changed to CTS 110 in entries 705, 707 in the hash map index table 702 (now table 706). Hence, both tables 700, 702 have been updated to become tables 704, 706, as shown in FIG. 7e.

FIG. 7d illustrates an exemplary table 708 that may be configured to be generated to include any undo records that may have been generated as a result of the updates/insertions/deletions performed during operations shown in FIGS. 7a-c. The undo records correspond to the records that have been updated (e.g., records shown in rows 701, 703 of table 700 shown in FIG. 7a). In some implementations, updates may be configured to be REMOVE operations on the hash map index, where removal and/or any UNDO operations may be executed asynchronously during late stages of a CLEANUP operation of the hash map index (whereby TCB cannot be used to identify a proper entry). Hence, a dedicated version field may be required to uniquely identify the entry onto which an operation has to be performed.

Figure 8:
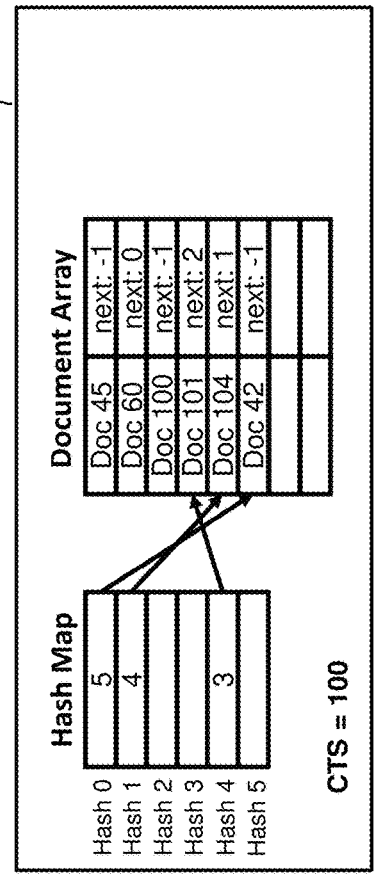
FIG. 8 illustrate exemplary tables including checkpointed and non-checkpointed data, according to some implementations of the current subject matter.
Figure 8:
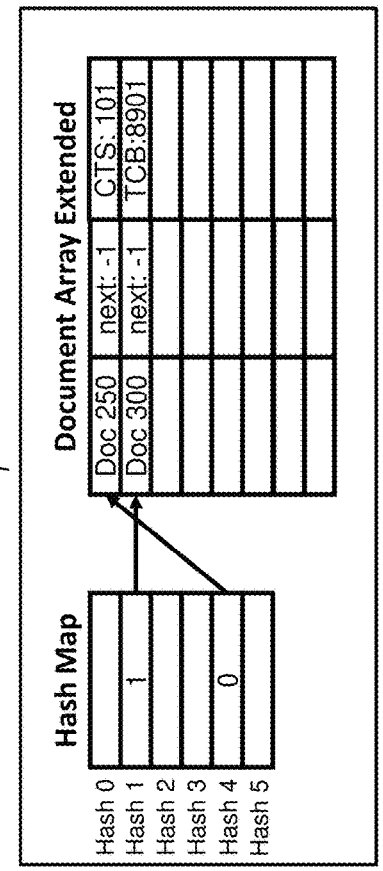

In some implementations, the current subject matter may be configured to execute a checkpoint operation, which may be configured to generate a snapshot for a particular commit timestamp (CommitTS or CTS), whereby a log replay may be configured to start at CommitTS+1. The system 100 may be configured to store checkpointed data (e.g., table 800 shown in FIG. 8) and non-checkpointed data (e.g., table 802 shown in FIG. 8) separately. Checkpointed data (e.g., data contained in table 800) may be visible (e.g., accessible, may be queried, updated, deleted, etc.) to all transactions that may be executed by system 800. In contrast, data that has not yet been checkpointed (e.g., as shown in table 802) might not be visible for some and/or all transactions, as the data's visibility is being determined by the system 100.

To execute a checkpointing operation, one or more data entries corresponding to the entries in the hash map index (e.g., entries 5, 4, 3) may be moved into a checkpointed set using an ADD operation. Transferring of entries into the checkpointed set may be performed based on a determination a value of the CommitTS is less than or equal to a predetermined minimum read timestamp value (min-ReadTS), i.e., CommitTS≤minReadTS. The data structures may then be flushed to disk. A corresponding transaction log may be truncated using CommitTS≤minReadTS.

In some implementations, for any entries that might not yet checkpointed (e.g., entries 1 and 0 and in the hash map index), the document array may be extended to include further data (e.g., CommitTS information and TCB information). For example, for entry 1, TCB 8901 may be included and for entry 1, CommitTS of 101 may be indicated (which may be greater than the minReadTS). During the next checkpoint run, minReadTS may have advanced and more data from the hash set 802 may be moved to the hash set 800.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 9:
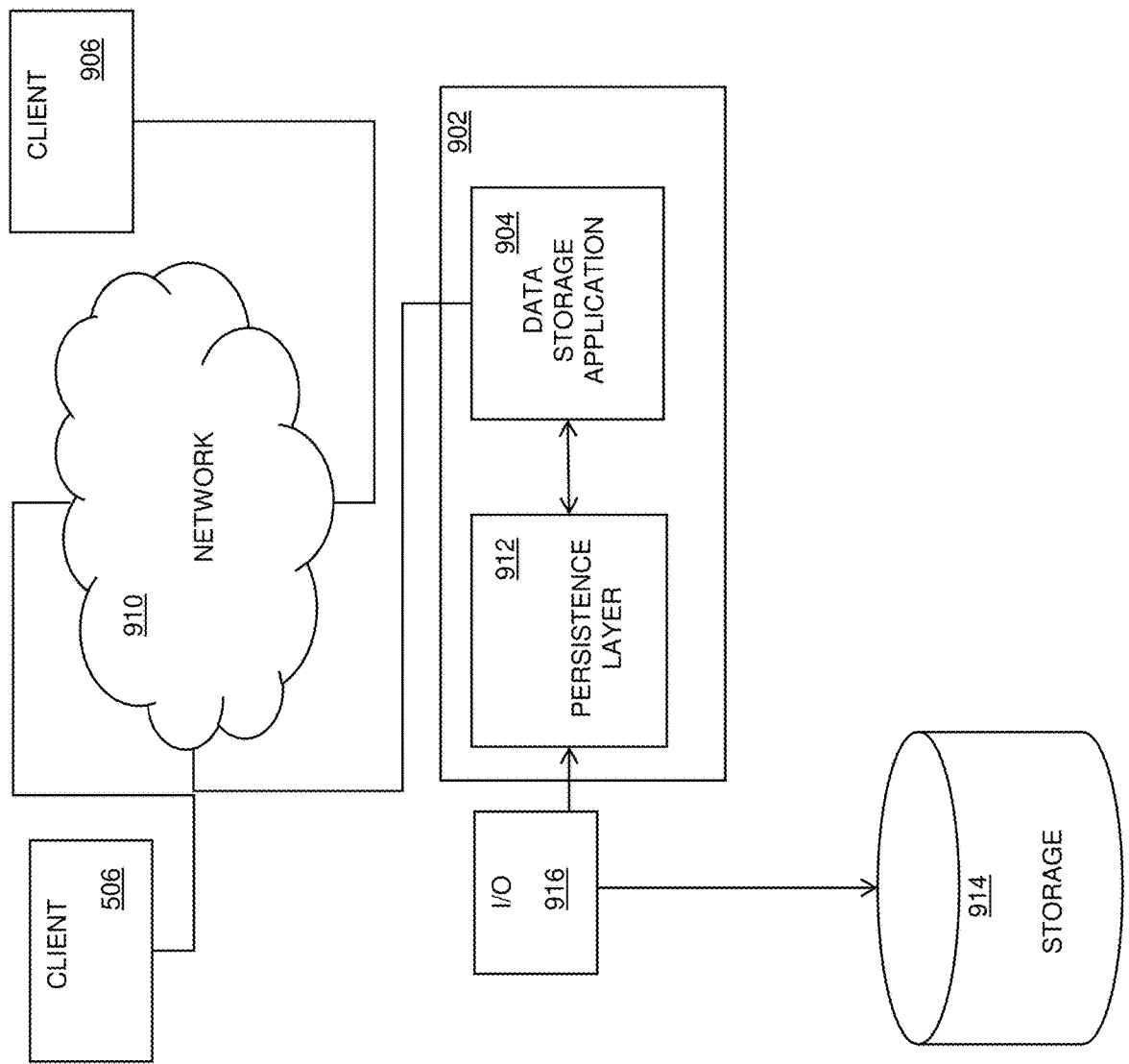
FIG. 9 is a diagram illustrating an exemplary system including a data storage application, according to some implementations of the current subject matter.

FIG. 9 illustrates an exemplary system 900 in which a computing system 902, which can include one or more programmable processors that can be collocated, linked over one or more networks, etc., executes one or more modules, software components, or the like of a data storage application 904, according to some implementations of the current subject matter. The data storage application 904 can include one or more of a database, an enterprise resource program, a distributed storage system (e.g. NetApp Filer available from NetApp of Sunnyvale, CA), or the like.

The one or more modules, software components, or the like can be accessible to local users of the computing system 902 as well as to remote users accessing the computing system 902 from one or more client machines 906 over a network connection 910. One or more user interface screens produced by the one or more first modules can be displayed to a user, either via a local display or via a display associated with one of the client machines 906. Data units of the data storage application 904 can be transiently stored in a persistence layer 912 (e.g., a page buffer or other type of temporary persistency layer), which can write the data, in the form of storage pages, to one or more storages 914, for example via an input/output component 916. The one or more storages 914 can include one or more physical storage media or devices (e.g. hard disk drives, persistent flash memory, random access memory, optical media, magnetic media, and the like) configured for writing data for longer term storage. It should be noted that the storage 914 and the input/output component 916 can be included in the computing system 902 despite their being shown as external to the computing system 902 in FIG. 9.

Data retained at the longer-term storage 914 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 10:
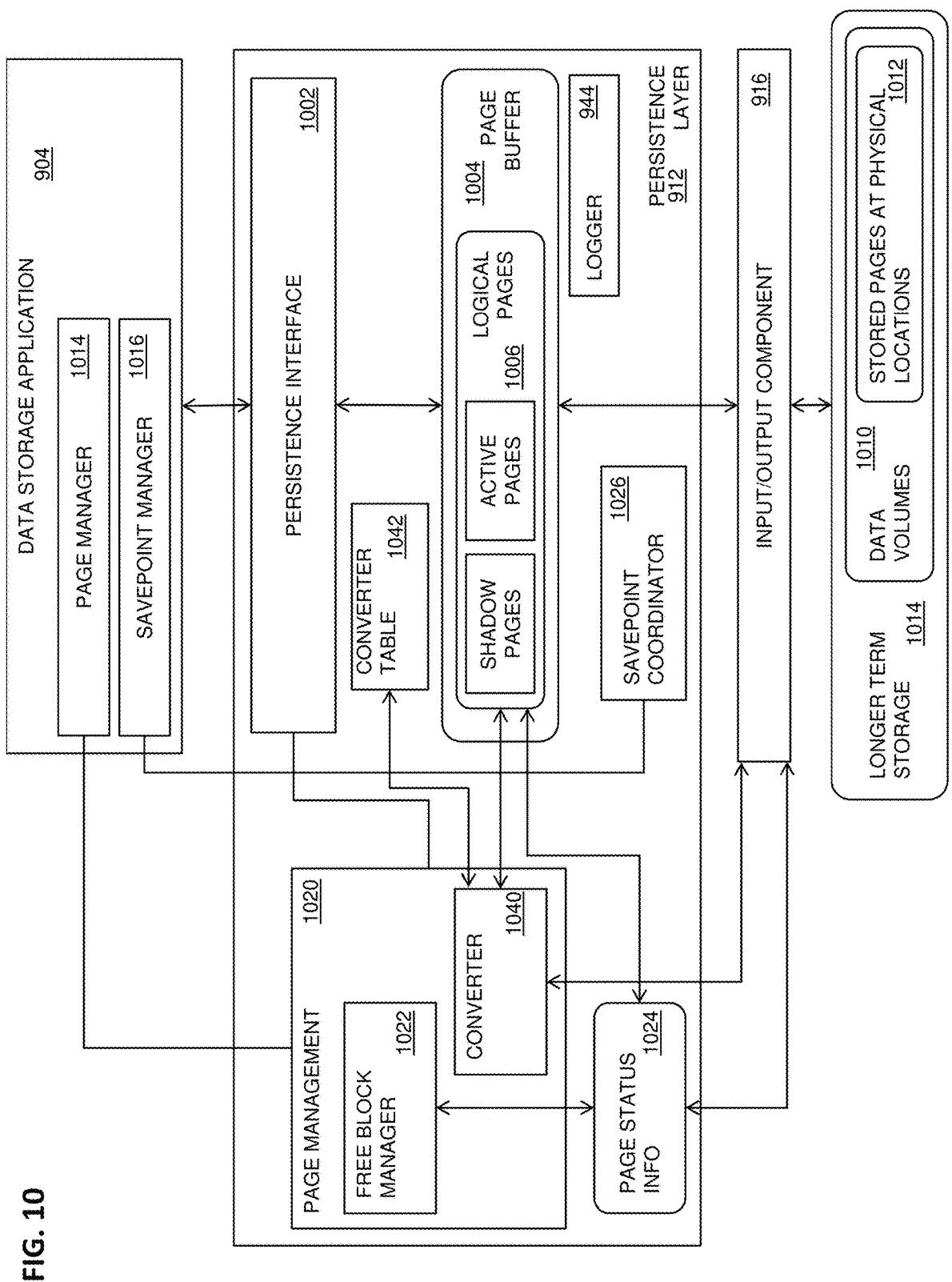
FIG. 10 is a diagram illustrating details of the system of FIG. 10.

FIG. 10 illustrates exemplary software architecture 1000, according to some implementations of the current subject matter. A data storage application 904, which can be implemented in one or more of hardware and software, can include one or more of a database application, a network-attached storage system, or the like. According to at least some implementations of the current subject matter, such a data storage application 904 can include or otherwise interface with a persistence layer 912 or other type of memory buffer, for example via a persistence interface 1002. A page buffer 1004 within the persistence layer 912 can store one or more logical pages 1006, and optionally can include shadow pages, active pages, and the like. The logical pages 1006 retained in the persistence layer 912 can be written to a storage (e.g. a longer term storage, etc.) 914 via an input/output component 916, which can be a software module, a sub-system implemented in one or more of software and hardware, or the like. The storage 914 can include one or more data volumes 1010 where stored pages 1012 are allocated at physical memory blocks.

In some implementations, the data storage application 904 can include or be otherwise in communication with a page manager 1014 and/or a savepoint manager 1016. The page manager 1014 can communicate with a page management module 1020 at the persistence layer 912 that can include a free block manager 1022 that monitors page status information 1024, for example the status of physical pages within the storage 914 and logical pages in the persistence layer 912 (and optionally in the page buffer 1004). The savepoint manager 1016 can communicate with a savepoint coordinator 1026 at the persistence layer 912 to handle savepoints, which are used to create a consistent persistent state of the database for restart after a possible crash.

In some implementations of a data storage application 904, the page management module of the persistence layer 912 can implement a shadow paging. The free block manager 1022 within the page management module 1020 can maintain the status of physical pages. The page buffer 1004 can include a fixed page status buffer that operates as discussed herein. A converter component 1040, which can be part of or in communication with the page management module 1020, can be responsible for mapping between logical and physical pages written to the storage 914. The converter 1040 can maintain the current mapping of logical pages to the corresponding physical pages in a converter table 1042. The converter 1040 can maintain a current mapping of logical pages 1006 to the corresponding physical pages in one or more converter tables 1042. When a logical page 1006 is read from storage 914, the storage page to be loaded can be looked up from the one or more converter tables 1042 using the converter 1040. When a logical page is written to storage 914 the first time after a savepoint, a new free physical page is assigned to the logical page. The free block manager 1022 marks the new physical page as "used" and the new mapping is stored in the one or more converter tables 1042.

The persistence layer 912 can ensure that changes made in the data storage application 904 are durable and that the data storage application 904 can be restored to a most recent committed state after a restart. Writing data to the storage 914 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 1044 can also be included to store the changes made to the data of the data storage application in a linear log. The logger component 1044 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 1044 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 912 can use a combination of undo log entries (from one or more logs) and shadow paging.

The persistence interface 1002 can handle read and write requests of stores (e.g., in-memory stores, etc.). The persistence interface 1002 can also provide write methods for writing data both with logging and without logging. If the logged write operations are used, the persistence interface 1002 invokes the logger 1044. In addition, the logger 1044 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 1044. For an entry of type "update", for example, this would be the identification of the affected record and the after image of the modified data.

When the data application 904 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 1044 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 1044 can write a database log (or simply referred to herein as a "log") sequentially into a memory buffer in natural order (e.g., sequential order, etc.). If several physical hard disks/storage devices are used to store log data, several log partitions can be defined. Thereafter, the logger 1044 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 904 can use shadow paging so that the savepoint manager 1016 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 11:
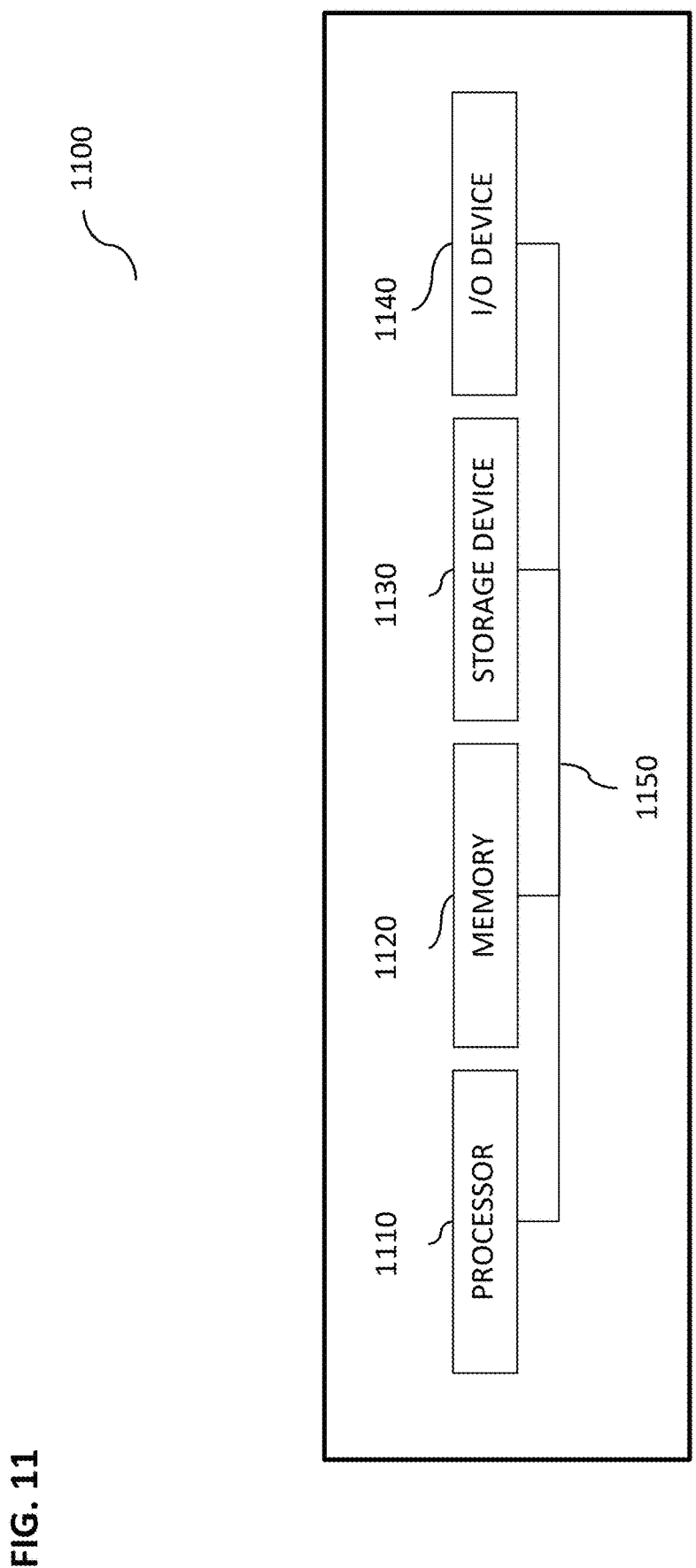
FIG. 11 is an exemplary system, according to some implementations of the current subject matter.

In some implementations, the current subject matter can be configured to be implemented in a system 1100, as shown in FIG. 11. The system 1100 can include a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 1100. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

Figure 12:
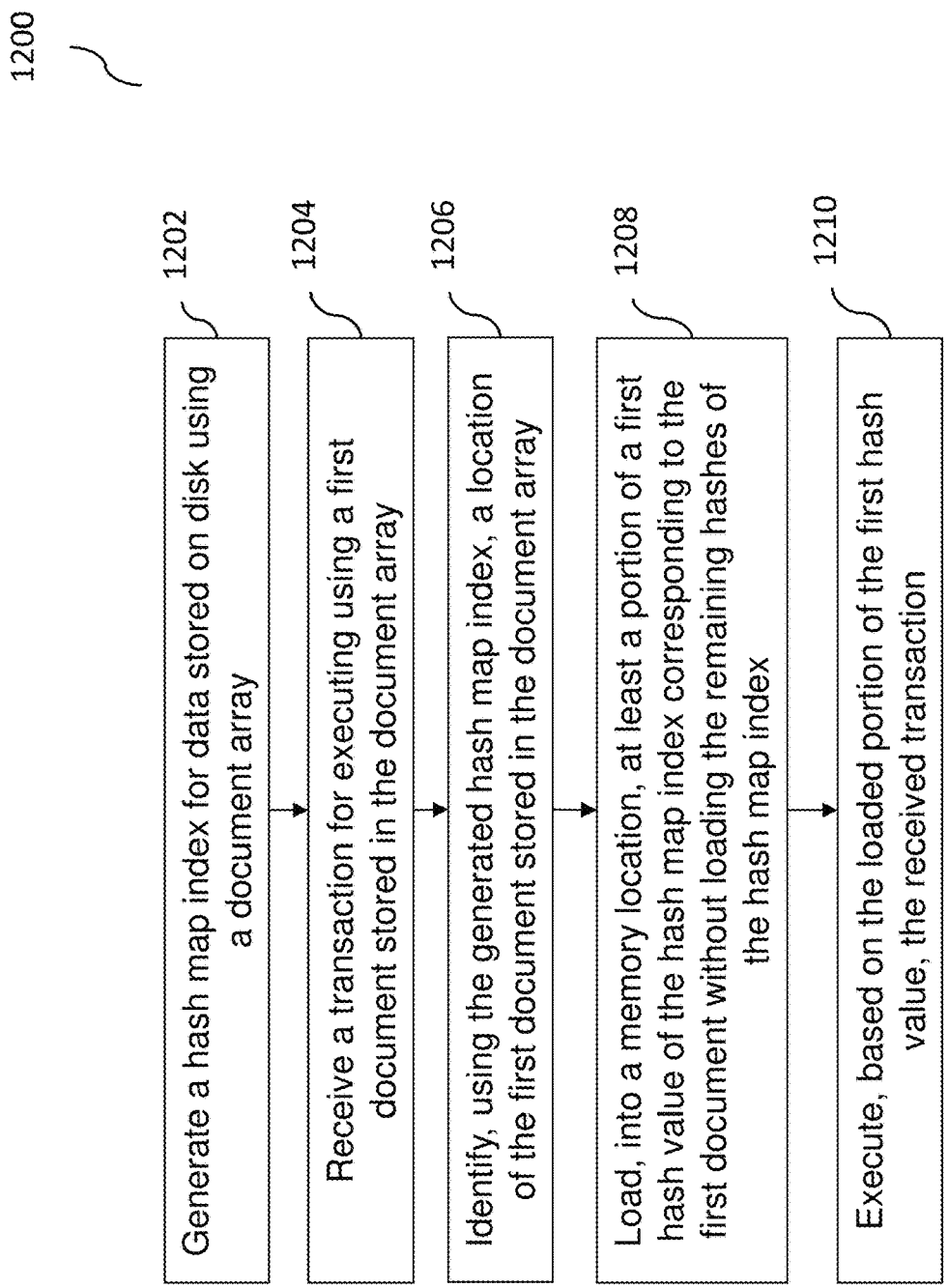
FIG. 12 is an exemplary method, according to some implementations of the current subject matter.

FIG. 12 illustrates an exemplary method 1200 for generating a hash map index, according to some implementations of the current subject matter. The method 1200 may be executed by the system 100 shown in FIG. 1 using data arranged in slices, as shown in FIG. 2. At 1202, a hash map index for data stored on disk using a document array may be generated. An exemplary hash map index may include the hash map index 502 shown in FIGS. 5*a-b*). The hash map index may include a plurality of hash values (as shown in FIGS. 5*a-b*), whereby each hash value in the plurality of hash values may identify a document stored at a predetermined location in the document array (e.g., document array 504 shown in FIGS. 5*a-b*).

At 1204, a transaction may be received for execution using a first document stored in the document array. At 1206, using the generated hash map index, a location of the first document (e.g., document 104 as shown in FIGS. 5*a-b*) stored in the document array may be identified. At 1208, at least a portion of a first hash value of the hash map index corresponding to the first document may be loaded into a memory location without loading the remaining hashes of the hash map index. At 1210, the received transaction (e.g., update, delete, etc.) may be executed based on the loaded portion of the first hash value (e.g., most significant bits).

In some implementations, the current subject matter can include one or more of the following optional features. In some implementations, the document array may include a plurality of linked documents. The identification of the location may include locating at least a second document stored in the document array based on the identification of the first document.

In some implementations, the loaded portion of the first hash value may include most-significant bits of the first hash value. The most-significant bits of the first hash value may correspond to the most-significant bits of a value in the first document.

In some implementations, the transaction may include at least one of the following: a data insert transaction, a data update transaction, a data delete transaction, a data read transaction, a data write transaction, and any combination thereof.

In some implementations, the method may include allowing at least one of the following: a plurality of read transaction on the data stored in the document store, a single write transaction at a time on the data stored in the document store, and any combination thereof.

In some implementations, the method may also include determining a threshold commit timestamp value for the received transaction, identifying one or more hash values in the hash map index corresponding to commit timestamp values being less than the threshold commit timestamp value, storing the identified one or more hash values in a checkpoint set, truncating a transaction log corresponding to the received transaction at a location corresponding to a location of the determined threshold commit timestamp in the transaction log, and erasing data previously stored in the checkpoint set, and executing commit of the received transaction with respect to the stored one or more hash values.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method, comprising:
   generating a hash map index for data stored on disk using a document array;
   receiving a transaction for execution using a first document stored in the document array;
   identifying, using the generated hash map index, a location of the first document stored in the document array;
   loading, into a memory location, at least a portion of a first hash value of the hash map index corresponding to the first document without loading remaining hashes of the hash map index; and
   executing, based on the portion of the first hash value, the transaction.

2. The method according to claim 1, wherein the document array comprises a plurality of linked documents.

3. The method according to claim 2, wherein the identifying comprises locating at least a second document stored in the document array based on the identification of the location of the first document.

4. The method according to claim 1, wherein the loaded portion of the first hash value comprises most-significant bits of the first hash value, and wherein the most-significant bits of the first hash value correspond to most-significant bits of a value in the first document.

5. The method according to claim 1, wherein the transaction comprises at least one of the following: a data insert transaction, a data update transaction, a data delete transaction, a data read transaction, a data write transaction, and any combination thereof.

6. The method according to claim 1, further comprising executing at least one of the following: a plurality of read transactions on the data stored in the document array, a single write transaction at a time on the data stored in the document array, and any combination thereof.

7. The method according to claim 1, further comprising:
   determining a threshold commit timestamp value for the received transaction;
   identifying one or more hash values in the hash map index corresponding to commit timestamp values being less than the threshold commit timestamp value;
   storing the identified one or more hash values in a checkpoint set;
   truncating a transaction log corresponding to the received transaction at a location corresponding to a location of the determined threshold commit timestamp in the transaction log, and erasing data previously stored in the checkpoint set; and
   executing a commit of the received transaction with respect to the stored one or more hash values.

8. A system comprising:
   at least one programmable processor; and
   a non-transitory machine-readable medium storing instructions that, when executed by the at least one programmable processor, cause the at least one programmable processor to perform operations comprising:
   generating a hash map index for data stored on disk using a document array;
   receiving a transaction for execution using a first document stored in the document array;
   identifying, using the generated hash map index, a location of the first document stored in the document array;
   loading, into a memory location, at least a portion of a first hash value of the hash map index corresponding to the first document without loading remaining hashes of the hash map index; and
   executing, based on the portion of the first hash value, the transaction.

9. The system according to claim 8, wherein the document array comprises a plurality of linked documents.

10. The system according to claim 9, wherein the identifying comprises locating at least a second document stored in the document array based on the identification of the location of the first document.

11. The system according to claim 8, wherein the loaded portion of the first hash value comprises most-significant bits of the first hash value, and wherein the most-significant bits of the first hash value correspond to most-significant bits of a value in the first document.

12. The system according to claim 8, wherein the transaction comprises at least one of the following: a data insert transaction, a data update transaction, a data delete transaction, a data read transaction, a data write transaction, and any combination thereof.

13. The system according to claim 8, wherein the operations further comprise executing at least one of the following: a plurality of read transaction on the data stored in the document array, a single write transaction at a time on the data stored in the document array, and any combination thereof.

14. The system according to claim 8, wherein the operations further comprise:
   determining a threshold commit timestamp value for the received transaction;
   identifying one or more hash values in the hash map index corresponding to commit timestamp values being less than the threshold commit timestamp value;
   storing the identified one or more hash values in a checkpoint set;
   truncating a transaction log corresponding to the received transaction at a location corresponding to a location of the determined threshold commit timestamp in the transaction log, and erasing data previously stored in the checkpoint set; and
   executing commit of the received transaction with respect to the stored one or more hash values.

15. A computer program product comprising a non-transitory machine-readable medium storing instructions that, when executed by at least one programmable processor, cause the at least one programmable processor to perform operations comprising:
   generating a hash map index for data stored on disk using a document array;
   receiving a transaction for execution using a first document stored in the document array;
   identifying, using the generated hash map index, a location of the first document stored in the document array;
   loading, into a memory location, at least a portion of a first hash value of the hash map index corresponding to the first document without loading remaining hashes of the hash map index; and
   executing, based on the portion of the first hash value, the transaction.

16. The computer program product according to claim 15, wherein the document array comprises a plurality of linked documents, and wherein the identifying comprises locating at least a second document stored in the document array based on the identification of the location of the first document.

17. The computer program product according to claim 15, wherein the loaded portion of the first hash value comprises most-significant bits of the first hash value, and wherein the most-significant bits of the first hash value correspond to most-significant bits of a value in the first document.

18. The computer program product according to claim 15, wherein the transaction comprises at least one of the following: a data insert transaction, a data update transaction, a data delete transaction, a data read transaction, a data write transaction, and any combination thereof.

19. The computer program product according to claim 15, wherein the operations further comprise executing at least one of the following: a plurality of read transaction on the data stored in the document array, a single write transaction at a time on the data stored in the document array, and any combination thereof.

20. The computer program product according to claim 15, wherein the operations further comprise:
   determining a threshold commit timestamp value for the received transaction;
   identifying one or more hash values in the hash map index corresponding to commit timestamp values being less than the threshold commit timestamp value;
   storing the identified one or more hash values in a checkpoint set;
   truncating a transaction log corresponding to the received transaction at a location corresponding to a location of the determined threshold commit timestamp in the transaction log, and erasing data previously stored in the checkpoint set; and
   executing commit of the received transaction with respect to the stored one or more hash values.

* * * * *